US012614274B2

(12) United States Patent (10) Patent No.: US 12,614,274 B2

Luo et al. (45) Date of Patent: Apr. 28, 2026

(54) DEFECT DETECTION METHOD AND DEVICE

(71) Applicant: Lenovo (Beijing) Limited, Beijing (CN)

(72) Inventors: Yi Luo, Beijing (CN); Xiao Xu, Beijing (CN); Dakun Yang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 280 days.

(21) Appl. No.: 18/461,027

(22) Filed: Sep. 5, 2023

(65) Prior Publication Data

US 2024/0104717 A1 Mar. 28, 2024

(30) Foreign Application Priority Data

Sep. 23, 2022 (CN) .......................... 202211163634.X

(51) Int. Cl.
| | |
|---|---|
| *G06T 7/00* | (2017.01) |
| *G06T 7/73* | (2017.01) |
| *G06V 10/74* | (2022.01) |
| *G06V 10/764* | (2022.01) |

(52) U.S. Cl.
CPC ............... *G06T 7/001* (2013.01); *G06T 7/74* (2017.01); *G06V 10/761* (2022.01); *G06V*

*10/764* (2022.01); *G06T 2207/20081* (2013.01); *G06V 2201/02* (2022.01)

(58) Field of Classification Search
None
See application file for complete search history.

(56) References Cited

U.S. PATENT DOCUMENTS

| | | | | |
|---|---|---|---|---|
| 12,229,943 B2 * | 2/2025 | Zhang | .................... | G01N 21/88 |
| 2018/0246044 A1 * | 8/2018 | Zhang | .................... | G02F 1/1309 |
| 2020/0349875 A1 * | 11/2020 | Wen | .................... | G09G 3/006 |
| 2023/0274411 A1 * | 8/2023 | Zhou | .................... | G06V 10/20 |
| | | | | 382/141 |

* cited by examiner

*Primary Examiner* — Leon Viet Q Nguyen
(74) *Attorney, Agent, or Firm* — ANOVA LAW GROUP, PLLC

(57) ABSTRACT

A defect detection method includes obtaining a first screen image and a second screen image of a screen module, in response to determining a defect area in the first screen image, determining an image feature correlation between the first screen image and the second screen image, and determining a defect detection result of the screen module based on the image feature correlation. The first screen image is an image displayed by a display screen collected when the display screen of the screen module is in a first test state. The second screen image is an image displayed by the display screen collected when the display screen is in a second test state. The defect area indicates that the screen module has a display defect.

17 Claims, 6 Drawing Sheets

Obtain a first screen image and a second screen image of a screen module — S101

In response to determining a defect area in the first screen image, determine an image feature correlation between the first screen image and the second screen image — S102

Determine a defect detection result of the screen module based on the image feature correlation — S103

201

203

202

DEFECT DETECTION METHOD AND DEVICE

CROSS-REFERENCE TO RELATED APPLICATION

The present disclosure claims priority to Chinese Patent Application No. 202211163634.X, filed on Sep. 23, 2022, the entire content of which is incorporated herein by reference.

TECHNICAL FIELD

The present disclosure relates to the defect detection technology field and, more particularly, to a defect detection method and a device.

BACKGROUND

In the assembly or manufacturing process of screen modules of electronic devices, display defect detection needs to be performed on the screens.

The display defect detection of the screen includes detecting whether a display defect caused by a defect of a display panel exists. However, dust, glues, or other particles often exist in the screen module manufacturing or assembly environment. Once such particles are adhered to the screen of the screen module, the screen module is falsely identified as having the display defects. Thus, the probability of false determination of the display defect detection of the screen module is high.

SUMMARY

Embodiments of the present disclosure provide a defect detection method. The method includes obtaining a first screen image and a second screen image of a screen module, in response to determining a defect area in the first screen image, determining an image feature correlation between the first screen image and the second screen image, and determining a defect detection result of the screen module based on the image feature correlation. The first screen image is an image displayed by a display screen collected when the display screen of the screen module is in a first test state. The second screen image is an image displayed by the display screen collected when the display screen is in a second test state. The defect area indicates that the screen module has a display defect.

Embodiments of the present disclosure provide an electronic device, including a processor and a memory. The memory stores a computer program that, when executed by the processor, causes the processor to obtain a first screen image and a second screen image of a screen module, in response to determining a defect area in the first screen image, determine an image feature correlation between the first screen image and the second screen image, and determine a defect detection result of the screen module based on the image feature correlation. The first screen image is an image displayed by a display screen collected when the display screen of the screen module is in a first test state. The second screen image is an image displayed by the display screen collected when the display screen is in a second test state. The defect area indicates that the screen module has a display defect.

Embodiments of the present disclosure provide a non-transitory computer-readable storage medium storing a computer instruction that, when executed by a processor, causes the processor to obtain a first screen image and a second screen image of a screen module, in response to determining a defect area in the first screen image, determine an image feature correlation between the first screen image and the second screen image, and determine a defect detection result of the screen module based on the image feature correlation. The first screen image is an image displayed by a display screen collected when the display screen of the screen module is in a first test state. The second screen image is an image displayed by the display screen collected when the display screen is in a second test state. The defect area indicates that the screen module has a display defect.

DETAILED DESCRIPTION OF THE EMBODIMENTS

The technical solution of the present disclosure can be applied to display defect detection of a screen module to improve the accuracy of the display defect detection of the screen module.

The technical solution of embodiments of the present disclosure is described in detail in connection with the accompanying drawings of embodiments of the present disclosure. The described embodiments are some embodiments of the present disclosure, not all embodiments. Based on embodiments of the present disclosure, all other embodiments obtained by those of ordinary skill in the art without creative effort are within the scope of the present disclosure.

Figure 1:
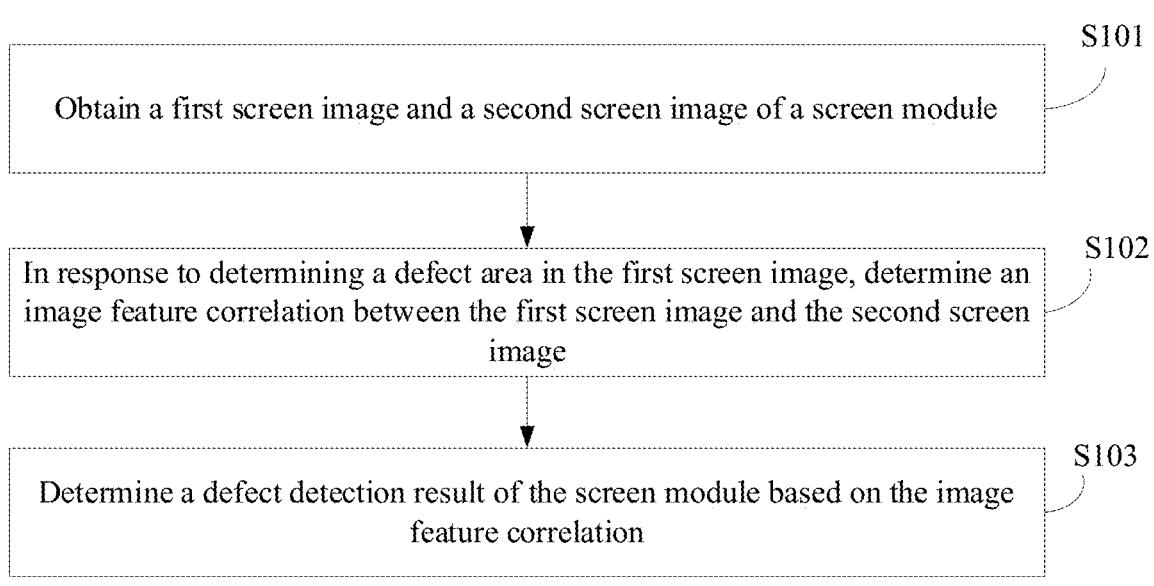
FIG. 1 illustrates a schematic flowchart of a defect detection method according to some embodiments of the present disclosure.

FIG. 1 illustrates a schematic flowchart of a defect detection method according to some embodiments of the present disclosure. The method of embodiments of the present disclosure can be applied to an electronic device, such as a single electronic device or an electronic device in a distributed system or an integrated system, which is not limited here.

The method of the present disclosure includes the following steps.

At S101, a first screen image and a second screen image of a screen module are obtained.

The screen module can be a module including a display screen configured to display an image. For example, the screen module can include a display screen, a circuit board of the display screen, a touch layer, etc., which is not limited to the present disclosure.

A first screen image is an image of the display screen obtained when the display screen of the display module is in a first test state. A second screen image is an image of the display screen obtained when the display screen is in a second testing state.

The first screen image and the second screen image can be images of the display screen of the screen module obtained using an image collection device outside the screen module.

The first test state and the second test state can be different. Based on this, the first screen image and the second screen image can be used as determination criteria for two different dimensions of determining whether display defects exist in the screen module.

In some embodiments, in the first test state, the display screen can display a defect image of a display defect of the screen module. In the second test state, the display screen can display substances of dust and glue adhering to an outer surface of the display screen.

For example, the display screen being in the first test state can include a display state when the display screen displays a set color mode. The display screen in the second test state can include that the display screen is in a black screen state.

The set color mode can be a color mode other than black. For example, the set color mode can be a gray display mode displayed by the display screen. The set color mode can also be red or another color that can highlight a defect area caused by the display defect.

The display screen in the black screen state can include that the display screen is in a standby state or controlling the display screen to be in a display state of displaying all black.

In the black screen state, some dust or other particles on the display screen can be easily highlighted and can be captured by an image collection device such as a recorder. Thus, The image of the display screen can display imaging of particles such as dust. However, in the black screen state, an abnormal display point or an abnormal display block caused by the display defect cannot be displayed on the display screen.

When the display screen is in the set color mode, since the display defect can cause the abnormal display point or the abnormal display block to be easily highlighted on the display screen, the collected image of the display screen can display the abnormal display point or the abnormal display block. However, dust or other particles on the display screen can also be collected by the image collection device.

At S102, if the defect area is determined to exist in the first screen image, an image feature correlation between the first screen image and the second screen image is determined.

The defect area can indicate the display defect in the screen module. For example, the defect area can be an imaging area displaying the abnormal point or the abnormal block due to the display defect of the display screen.

The defect area of the first screen image can be obtained by performing a defect detection on the first screen image.

The display defect detection can be performed in a plurality of methods on a single image. For example, in some embodiments, the first screen image can be input to a defect detection model to obtain an image detection result output by the defect detection model. The defect detection model can be obtained and trained using a plurality of image samples marked with defects or other types of target areas. The defect detection model can be trained in any supervision training method, which is not limited. Correspondingly, if the image detection result output by the defect detection model represents the defect area existing in the first screen image, the defect area can exist in the first screen image.

The defect detection method for the single image can also include any general detection method, which is not limited.

Since particles such as dust are adhered to the display screen of the display module, the detection result obtained by performing the defect detection based on the first screen image can often be falsely determined. Thus, the defect area of the first screen image may not be an image of the defect caused by the display defect.

Based on this, to reduce false positives of the display defect, in the present disclosure, the image feature correlation between the first screen image and the second screen image obtained when the display screen of the display module is in the second test state can be determined.

The image feature correlation can be a feature correlation between the image content of the first screen image and the image content of the second screen image.

In some embodiments, the image feature correlation can be an image feature similarity between the first screen image and the second screen image. Whether the image content of the first screen image and the image content of the second screen image are the same or similar can be reflected by the image feature similarity between the first screen image or the second screen image.

In some other embodiments, the image feature correlation can be a category feature between the first screen image and the second screen image. This category feature can be used to represent whether the content of the first screen image and the content of the second screen image have the same feature. Correspondingly, based on the category feature, the target category to which the first screen image and the second screen image belong can be determined.

The target category can be one of a first category and a second category. The first category can be used to indicate that the content features of the two images are the same, and the second category can be used to indicate that the content features of the two images are different.

The above describes two methods of determining the image feature correlation. In some embodiments, the image feature correlation can also be determined in another method, which is not limited.

At S103, based on the image feature correlation, the defect detection result of the screen module is determined.

The defect detection result can be a detection result of representing whether the screen module includes the display defect.

The first screen image and the second screen image can be images of the display screen collected when the display screen of the screen module is in different test states. Thus, when the display defect is determined based on the first screen image, the second screen image can be an auxiliary determination criterion for determining whether the defect area of the first screen image is a defect image caused by the display defect.

Based on this, when the first screen image is determined to include the defect area representing the display defect, the possibility of the display defect can be further verified in connection with the image feature correlation between the first screen image and the second screen image. Thus, the accuracy of the determined defect detection result can be improved.

In the present disclosure, if no defect area is detected in the first screen image, the screen module can be determined to not include the display defect. Thus, the image feature correlation between the first screen image and the second screen image may not need to be determined.

Based on the above, in embodiments of the present disclosure, if the first screen image of the screen module includes the defect area used to represent the display defect in the screen module, the image feature correlation between the first screen image and the second screen image can be determined. Since the first screen image and the second screen image are images of the display screen of the screen module in different test states, the possibility of having a display defect in the screen module can be reflected in different dimensions through the first screen image and the second screen image. Thus, in connection with the image feature correlation of the screen images in two test states, the defect of the screen module can be more accurately determined. The defect detection result can be more accurate, and the false positive of the display defect detection can be reduced.

In the present disclosure, the method of determining the defect detection result in connection with the feature correlation between the first screen image and the second screen image can be different based on the difference between the first test state and the second test state.

To facilitate understanding, an implementation can be described below.

In some embodiments, determining the defect detection result can include determining that the screen module does not have the display defect if the image feature correlation indicates that the image features of the first screen image and the second screen image are similar.

For example, the image feature correlation can be the image feature similarity between the first screen image and the second screen image. If the image feature similarity exceeds the predetermined threshold, the image features can be determined to be similar. Thus, the screen module can be determined to not have the display defect.

For another example, the image feature correlation can be the target category to which the first screen image and the second screen image belong. If the target category is a first category indicating that the two screen images are similar, the screen module can be determined to not have the display defect.

Based on the above, when the display screen is in the first test state, the collected first screen image can include an image of the display defect caused by the screen module. Therefore, by combining the defect detection of the first screen image, whether the first screen image includes the defect area indicating the display defect can be preliminarily determined. However, since the display screen is in the first test state, if particles such as dust are on the display screen, the collected first screen image can also show the particles such as dust. The particles such as the dust can be falsely determined to be the image of the display defect.

Based on this, if the second screen image collected when the display screen is in the second test state can present the impurity area of the particles such as the dust and cannot clearly or cannot represent the image related to the display defect if the first screen image includes the defect area, and the first screen image and the second screen image have similar features, the defect area of the first screen image can be the same as the impurity area of the second screen image. Correspondingly, the defect area presented in the first screen image can also be the image of the particles such as the dust not the image of the display defect. Thus, the screen module can be determined to not have the display defect. The situation of falsely determining the particles such as dust as the display defect can be reduced.

In some embodiments, determining the defect detection result can also include, if the image feature correlation indicates that the image features of the first screen image and the second screen image are not dissimilar, determining that the screen module includes the display defect.

If the image feature correlation between the first screen image and the second screen image indicates that the two images are not similar, the image of the defect area of the first screen image can be different from the image of the particles such as dust of the second screen image, or the defect area of the first screen image can include the impurity area of dust and another area indicating the display defect. Thus, the screen module can be determined to have a display defect.

Figure 2:
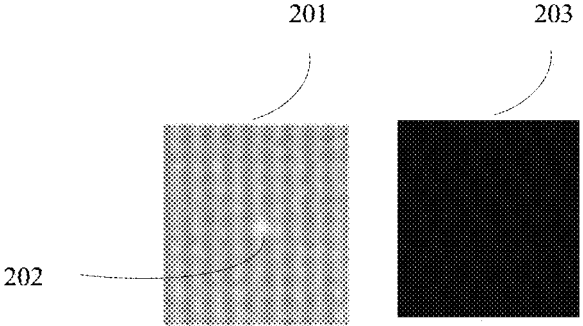
FIG. 2 illustrates a schematic diagram showing a comparison between a first screen image and a second screen image under a defect detection result according to some embodiments of the present disclosure.
Figure 3:
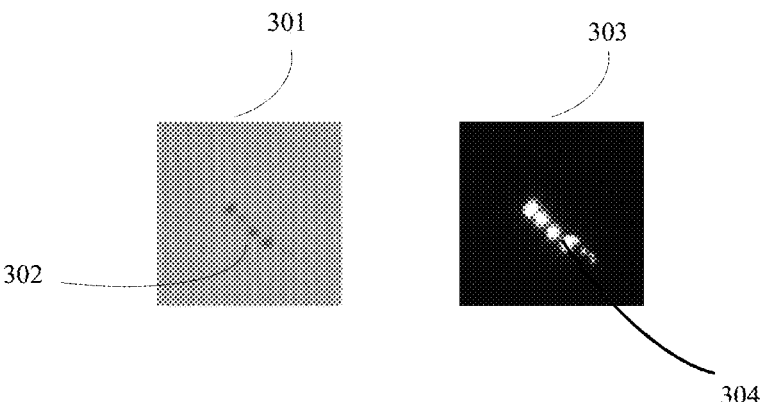
FIG. 3 illustrates a schematic diagram showing a comparison between a first screen image and a second screen image under another defect detection result according to some embodiments of the present disclosure.
Figure 4:
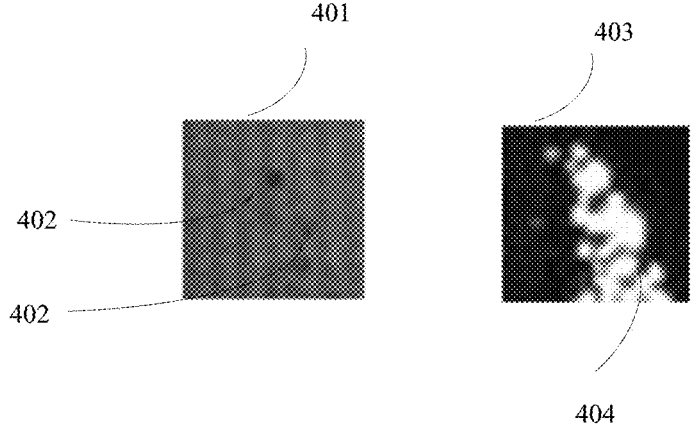
FIG. 4 illustrates a schematic diagram showing a comparison between a first screen image and a second screen image under another defect detection result according to some embodiments of the present disclosure.

To facilitate understanding, FIG. 2 to FIG. 4 illustrate schematic diagrams showing the comparison between the first screen image and the second screen image under the defect detection results according to some embodiments of the present disclosure.

To facilitate the understanding and description, for example, the display screen in the second test state is the display screen in a black screen state, and the display screen in the first test state is the display screen displaying a gray image (also including other non-black color images displayed by the display screen).

To facilitate description, for example, the particles existing in the display screen can include dust.

In FIG. 2 to FIG. 4, the gray image on the left represents the first screen image collected when the display screen outputs the gray image, and the black image on the right represents that the display screen is in the second test state. That is, the black image is the second screen image collected in the black screen state.

As shown in FIG. 2, a first screen image 201 on the left includes a point-shaped defect area 202. The second screen image 203 on the right does not include the image of the particles such as dust. Thus, the display screen does not have dust, and the situation of falsely determining that the first screen image has the defect area due to the interference of dust may not happen.

Based on this, as shown in FIG. 2, the first screen image corresponding to the gray image of the display screen includes the defect area, and the second screen image corresponding to the black screen state of the display screen does not have the dust area. Thus, the defect detection result can include that the screen module has a display defect.

According to the technical solution of the present disclosure, after the image feature correlation between the first screen image and the second screen image is determined, since the two screen images are not similar, the image feature correlation can indicate that the first screen image and the second screen image are not similar. Thus, the determined defect detection result can include that the screen module has a display defect. Then, the defect detection result determined by the technical solution of the present disclosure can be consistent with the result of FIG. 2.

For the situation that the first screen image corresponding to the gray image of the display screen has the defect area, and the second screen image corresponding to the black screen state also has dust, two cases can be involved.

In a first case, the defect area of the first screen image can be the false detection due to dust on the display screen. However, the screen module actually does not have a display defect.

In a second case, the first screen image has the defect area, and the defect area can be the corresponding defect area represented in the display screen caused by the display defect of the screen module.

For the first case, if the defect area in the first screen image is the false detection caused by dust on the display screen, the second screen image collected when the display screen is in the black screen state can also have the corresponding defect area, which is shown in FIG. 3.

As shown in FIG. 3, the first screen image 301 on the left has a defect area 302 in a long strip shape. A second screen image 303 on the right has the same dust area 304 in the long strip shape.

Based on FIG. 3, the defect area existing in the first screen image is determined by performing the defect detection on the first screen image. The image feature correlation between the first screen image and the second screen image can be determined through the technical solution of the present disclosure. As shown in FIG. 3, the image feature correlation between the first screen image and the second screen image indicates that the image contents of the two screen images are similar. Based on this, the screen module can be determined to have no display defect through the technical solution of the present disclosure. That is, the defect area in the first screen image can be caused by dust, which is similar as the first case. Based on this, the situation that dust on the display screen leads to the display defect by mistake can be eliminated through the technical solution of the present disclosure.

Similarly, for the second case, if the defect area of the first screen image is caused by the display defect, and the display screen also has dust, the second screen image collected in the black screen state can also have the dust area. Then, the first screen image can include the dust area and the defect area, and the second screen image can only include the dust area. Thus, the first screen image and the second screen image can be different.

As shown in FIG. 4, a first screen image 401 on the left includes a defect area 402 formed by a plurality of circular points that are distributed clearly and not clearly. A second screen image 403 on the right includes a dust area 404. The defect area 402 is different from the dust area 404. Based on this, after determining that the first screen image has a defect area, the image feature correlation between the first screen image and the second screen image determined through the technical solution of the present disclosure can indicate that the image features of the first screen image and the second screen image are not similar. Then, the screen module can be determined to have a display defect, which is consistent with the second case. Based on this, in the technical solution of the present disclosure, the situation that the screen module is directly false determined to not have the defect based on the dust of the second screen image when the display screen is in the black screen state to cause the missed detection can be reduced.

The above illustrates a possible implementation of determining the display defect result according to an example of the information indicated by the second screen image when the display screen is in the second test state. However, in some embodiments, another method of determining the display defect result can be included when the second test state is different, which is not limited here.

The first screen image and the second screen image are the image of the whole display screen. The dust and the possible defect area can only occupy a small portion of the display screen. Assuming that the dust on the display screen leads to the false detection of the first screen image having the defect area. The test states of the display screen corresponding to the first screen image and the second screen image can be different. In some embodiments, some dust areas represented in the first screen image may not be displayed clearly in the first screen image. Thus, the image feature correlation of the first screen image and the second screen image can be determined to indicate that the two screen images are not similar. Thus, the screen module can be falsely determined to have the display defect.

Based on this, to further improve the accuracy of display defect detection, after determining that the first screen image has the defect area, whether the images in the position areas corresponding to the defect area of the first screen image and the defect area of the second screen image are similar can be compared.

Figure 5:
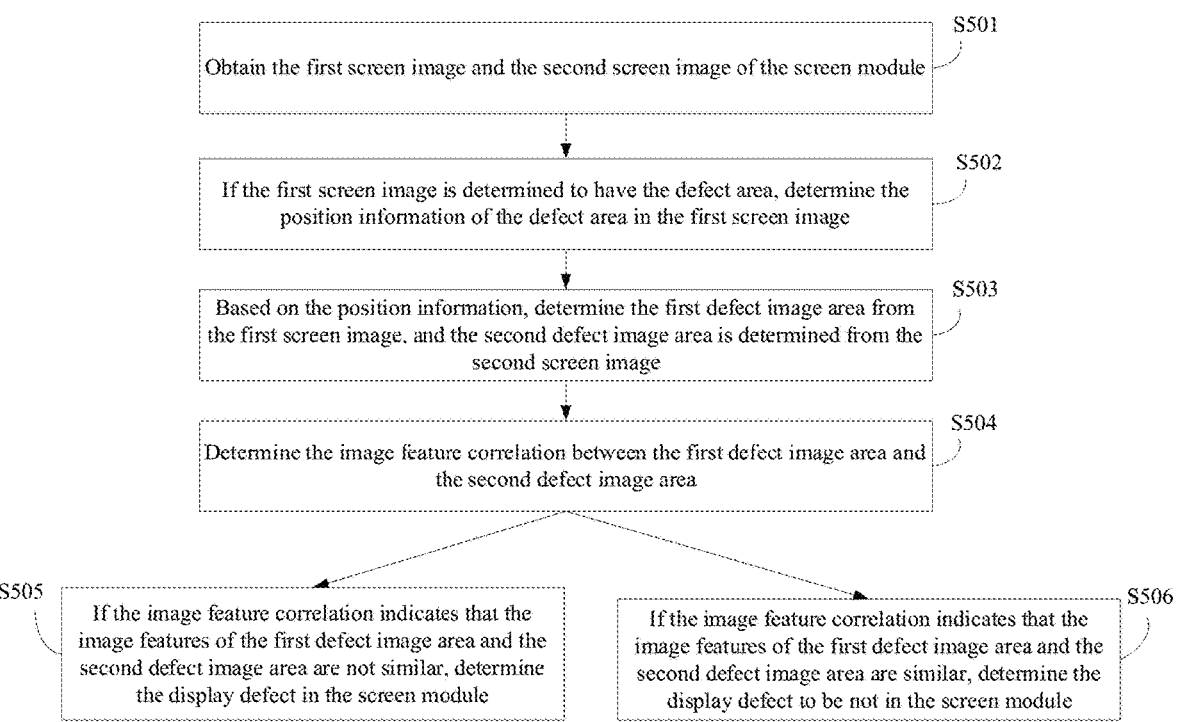
FIG. 5 illustrates a schematic flowchart of another defect detection method according to some embodiments of the present disclosure.

FIG. 5 illustrates a schematic flowchart of another defect detection method according to some embodiments of the present disclosure. The method can include the following steps.

At S501, the first screen image and the second screen image of the screen module are obtained.

The first screen image can be an image displayed by the display screen collected when the display screen of the screen module is in the first test state. The second screen image can be an image displayed by the display screen collected when the display screen of the screen module is in the second test state.

For example, the first screen image can be an image displayed by the display screen when the display screen is in a mode of outputting a predetermined color, and the second screen image can be an image displayed by the display screen in a black screen state.

At S502, if the first screen image is determined to have the defect area, the position information of the defect area in the first screen image is determined.

The defect area can indicate that the screen module has a display defect.

For the method of determining that the first screen image has the defect area, reference can be made to the above embodiments, which are not repeated here.

The position information of the defect area in the first screen image can be used to position the defect area in the first screen image. For example, the position information can include a coordinate range of the defect area in the first screen image.

In the process of performing the defect detection on the first screen image, if the first screen image is detected to have the defect area, the position information of the defect area can be determined.

For example, the first screen image can be input into a defect detection model. If the defect detection model detects a defect area in the first screen image, the position information of the defect area can be marked in the output first screen image.

The position information of the defect area can be determined in other methods, which are not limited.

At S503, based on the position information, the first defect image area is determined from the first screen image, and the second defect image area is determined from the second screen image.

The first defect image area can include at least the defect area. The second defect image area can include at least an image area in the second screen image matching the position information.

The first screen image and the second screen image can be the image displayed by the display screen. Thus, the position information of the defect area in the first screen image can indicate the corresponding position of the defect area on the display screen. Based on this, in connection with the position information of the defect area, the image area in the second screen image corresponding to the position information can be determined. Thus, the second defect image area can be determined.

In some embodiments, the image of the defect area can be extracted from the first screen image to obtain the first defect image area. Correspondingly, the image area corresponding to the position information of the defect area can be extracted from the second screen image to obtain the second defect image area.

At S504, the image feature correlation between the first defect image area and the second defect image area is determined.

As shown in FIG. 2 to FIG. 4, the first screen image is the first defect image area extracted from the first screen image, and the second screen image is the second defect image extracted from the second screen image.

The method of determining the image feature correlation between the first defect image area and the second defect image area can be the same as the method of determining the image feature correlation between the first screen image and the second screen image.

For example, in some embodiments, the image feature correlation can be the image feature similarity between the first defect image area and the second defect image area.

In some other embodiments, determining the image feature correlation can include determining a category feature between the first defect image area and the second defect image area. The category feature can be used to indicate whether the content in the first defect image area is feature-wise similar to the content in the second defect image area. Based on the category feature, a target category to which the first defect image area and the second defect image area belong can be determined. The target category can be one of a first category and a second category. The first category can indicate that the features of the contents of the two images are the same. The second category can indicate the features of the contents of the two images are not the same.

At S505, if the image feature correlation indicates that the image features of the first defect image area and the second defect image area are not similar, the display defect is determined in the screen module.

At S506, if the image feature correlation indicates that the image features of the first defect image area and the second defect image area are similar, the display defect is not determined in the screen module.

For example, if the image feature correlation is the image feature similarity between the first defect image area and the second defect image area, the first defect image area and the second defect image area can be determined to be similar when the image feature similarity exceeds the predetermined threshold. Otherwise, if the image feature similarity does not exceed the predetermined threshold, the first image defect area and the second image defect area can be determined to be not similar.

For another example, if the image feature correlation is the target category to which the first defect image area and the second defect image area belong, the image features of the two defect image areas can be indicated to be similar when the target category is the first category. Otherwise, if the target category is the second category, the image features of the two defect image areas can be indicated to be not similar.

To facilitate the understanding, the description can be made by taking the first test state being the display screen in the mode of displaying a gray color and the second test state being the display screen in the black screen state. If the first screen image includes the defect area, based on the position of the defect area in the display screen, the dust image same as the defect area can be determined at the corresponding position in the second screen image. Thus, the defect area of the first screen image can be determined to be caused by the dust on the display screen, and no defect can exist in the screen module.

In the embodiment, since only image areas corresponding to the defect areas of the first screen image and the second screen image are compared, even dust appears at a position outside the defect area of the second screen image, and no image of the corresponding dust is shown in the other areas outside the defect area of the first screen image, the first screen image and the second screen image may not be determined to be no similar. Thus, the defect area of the first screen image caused by the dust may not be falsely determined as the defect caused by the display defect.

In summary, in embodiments of the present disclosure, if the first screen image includes the defect area, the first defect image area at the position corresponding to the defect area can be determined from the first screen image. The second defect image area at the position corresponding to the defect area can be determined from the second screen image. Based on this, in the present disclosure, only the image feature correlation between the first defect image area including the defect area and the second defect image area corresponding to the defect area in the second screen image. The situation of falsely determining the display defect caused by the interference by the image outside the defect area can be reduced. Thus, the accuracy of the display defect detection can be further improved.

In embodiments of the present disclosure, the image feature similarity between the two images can be determined in a plurality of methods, which are not limited.

To facilitate understanding, the method of determining the image feature similarity in connection with a similarity matching model is described below.

The similarity matching model can be obtained through the training based on a plurality of pairs of images marked with similarity matching results. Each pair of image samples can include two image samples. The similarity matching result of a pair of image samples can be used to indicate whether the image features of the pair of image samples are similar. Correspondingly, the similarity matching result can include two types of results, i.e., similar or not.

The similarity matching model can be trained in any supervised training method, which is not limited.

After the similarity matching model is trained, the first defect image area and the second defect image area can be input into the similarity matching model to obtain the image feature similarity between the first defect image area and the second defect image area output by the similarity matching model.

A network structure of the similarity matching model can be set as needed and is not limited.

Figure 6:
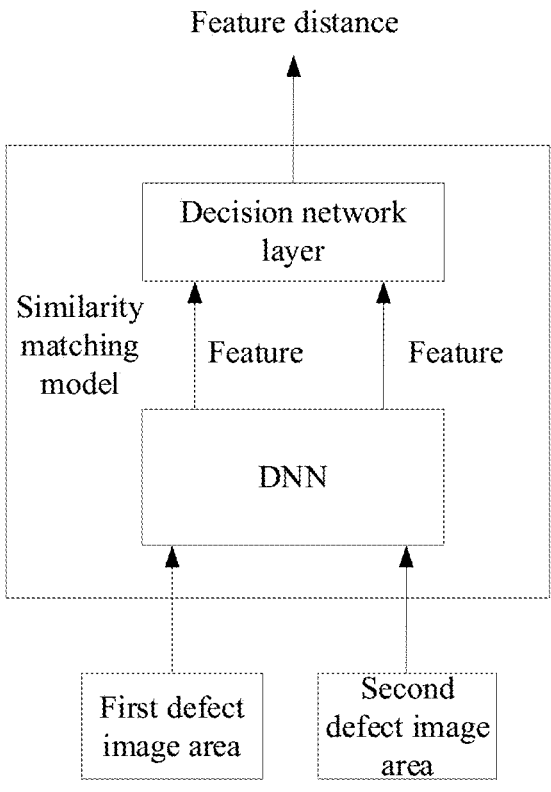
FIG. 6 illustrates a schematic diagram showing a principle of determining a feature similarity based on a similarity match model according to some embodiments of the present disclosure.

FIG. 6 illustrates a schematic structural diagram of a similarity matching model according to some embodiments of the present disclosure.

As shown in FIG. 6, the similarity matching model includes deep neural networks (DNN) and a decision network layer.

The DNN model can be configured to extract the image features from two images, and the decision network layer can be configured to calculate the similarity between the image features of the two images. In some embodiments, a feature distance between the image features of the two images can be calculated. When the feature distance is smaller, the similarity can be higher. Correspondingly, whether the two images are similar can be determined based on the similarity between the two images.

In the process of training the similarity matching model, a pair of image samples with a similarity matching result indicating similarity can be used as a positive sample pair, while a pair of image samples with a similarity matching result indicating dissimilarity can be used as a negative sample pair.

In the present disclosure, a training purpose for training the similarity matching model can include that the feature distance between the features of the two image samples is as small as possible in the positive sample pair, and the feature distance between the features of the two image samples is as big as possible in the negative sample pair. Based on the training purpose, the similarity matching model configured to determine whether the first defect image area and the second defect image area are similar can be trained.

Based on this, as shown in FIG. 6, after inputting the first defect image area and the second defect image area into the DNN model of the similarity matching model, the DNN model can determine the image features of the two images and input the image features to the decision network layer. Correspondingly, if the defect area in the first defect image area is caused by the dust, the feature distance between the image feature of the first defect image area determined by the DNN model and the image feature of the second defect image area determined by the DNN model can be smaller than a target threshold. Thus, the image feature similarity between the two defect image areas can be determined to exceed the predetermined threshold.

As shown in FIG. 6, the decision network layer is able to directly output the feature similarity between the first defect image area and the second defect image area through training, which has a similar principle and is not repeated here.

The above description is made by taking the image feature similarity between the first defect image area and the second defect image area as an example, which is also suitable for determining the image feature similarity between the first screen image and the second screen image.

In the present disclosure, the image feature correlation between the two images can also be determined in connection with a pre-trained model. To facilitate understanding, an example of determining the target category to which the first defect image area and the second defect image area belong can be described.

In the present disclosure, a category comparison model and a classification model can be pre-trained. The category comparison model and the classification model can be obtained through training based on the plurality of pairs of image samples marked with the belonging category. The category comparison model and the classification model can be trained synchronously and do not need to be trained separately.

Accordingly, in the present disclosure, the first defect image area and the second defect image area can be input into the category comparison model as a set of images to obtain the category feature output by the category comparison model. Based on this, the category feature can be input into the classification model to obtain the target category output by the classification model.

Figure 7:
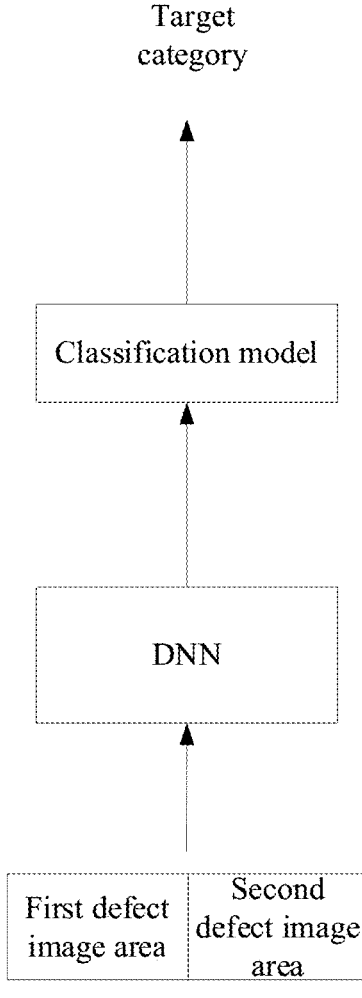
FIG. 7 illustrates a schematic diagram of determining categories of two images based on a category comparison model and a classification model according to some embodiments of the present disclosure.

Description can be made to an example of the category comparison model and the classification model. FIG. 7 illustrates a schematic diagram of determining the image feature correlation between the first defect image area and the second defect image area based on the category comparison model and the classification model according to some embodiments of the present disclosure.

In FIG. 7, a DNN model is used as the category comparison model. A classification model is connected to the DNN model. The classification model can include but is not limited to a fully connected network layer with a normalization function layer.

In the present disclosure, the purpose for training the category comparison model and the classification model can include that the image sample of the display defect caused by the dust and the image sample in the second test state (e.g., the display screen in the black screen state) are identified to belong to the same category.

In FIG. 7, after splicing the first defect image area and the second defect image area as one set of images and inputting the one set of images into the DNN model, the DNN model outputs the category feature for the set of images. After the category feature is input to the classification model, the classification model outputs the target category that indicates whether the first defect image area and the second defect image area are similar. For example, "1" represents the first category, and "0" represents the second category. Based on this, if the classification model outputs "1," the first defect image area and the second defect image area can be indicated to belong to the same category. That is, the two defect image areas are similar.

The above description is made by taking the target category between the first defect image area and the second defect image area as an example. The principle of determining the target category between the first screen image and the second screen image can be similar, which is not limited.

Corresponding to the defect detection method of the present disclosure, the present disclosure further provides a defect detection device.

Figure 8:
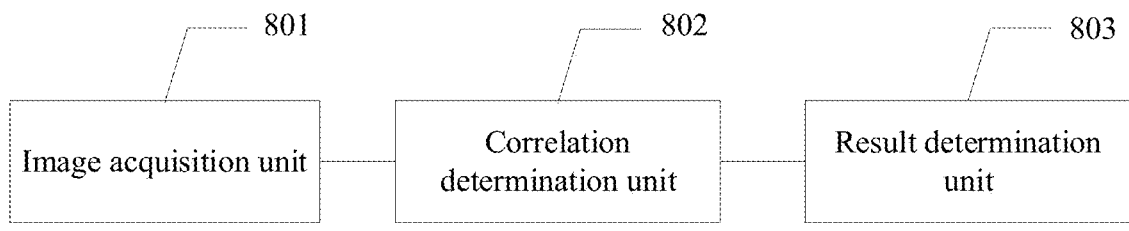
FIG. 8 illustrates a schematic structural diagram of a defect detection device according to some embodiments of the present disclosure.

FIG. 8 illustrates a schematic structural diagram of the defect detection device according to some embodiments of the present disclosure. The device of embodiments of the present disclosure includes an image acquisition unit 801, a correlation determination unit 802, and a result determination unit 803.

The image acquisition unit 801 can be configured to obtain the first screen image and the second screen image of the screen module. The first screen image can be an image displayed by the display screen that is collected when the display screen of the screen module is in the first test state. The second screen image can be the image displayed by the display screen that is collected when the display screen of the screen module is in the second test state.

The correlation determination unit 802 can be configured to determine the image feature correlation between the first screen image and the second screen image if the defect area is determined in the first screen image. The defect area can indicate that the screen module has the display defect.

The result determination unit 803 can be configured to determine the defect detection result of the screen module based on the image feature correlation.

In some embodiments, the result determination unit can include a first result determination unit and a second result determination unit.

The first result determination unit can be configured to determine that the screen module has the display defect if the image feature correlation indicates that the image features of the first screen image and the second screen image are not similar.

The second result determination unit can be configured to determine that the screen module does not have the display defect if the image feature correlation indicates that the image features of the first screen image and the second screen image are similar.

In some other embodiments, the correlation determination unit can include a position determination unit, an image area determination unit, and a feature correlation determination unit.

The position determination unit can be configured to determine the position information of the defect area in the first screen image if the defect area is determined in the first screen image.

The image area determination unit can be configured to determine the first defect image area from the first screen image and the second defect image area from the second screen image based on the position information. The first defect image area can include at least the defect area, and the second defect image area can include at least the image area in the second screen image that matches the position information.

The feature correlation determination unit can be configured to determine the image feature correlation between the first defect image area and the second defect image area.

In some other embodiments, the feature correlation determination unit can include a similarity determination unit and a second result determination unit.

The similarity determination unit can be configured to determine the image feature similarity between the first defect image area and the second defect image area.

The second result determination unit can be configured to, when the image feature correlation indicates that the image features of the first screen image and the second screen image are similar, determine the image features of the first screen image and the second screen image to be similar if the image feature similarity exceeds the predetermined threshold.

In some other embodiments, the similarity determination unit can include a similarity determination sub-unit.

The similarity determination sub-unit can be configured to input the first defect image area and the second defect image area into the similarity matching model to obtain the image feature similarity between the first defect image area and the second defect image area output by the similarity matching model. The similarity matching model can be trained based on the plurality of pairs of image samples marked with the similarity matching results.

In some other embodiments, the feature correlation determination unit can include a category feature determination unit and a category determination unit.

The category feature determination unit can be configured to determine the category feature between the first defect image area and the second defect image area. The category feature can be used to represent whether the content in the first defect image area is the same as the content in the second defect image area.

The category determination unit can be configured to determine the target category to which the first defect image area and the second defect image area belong based on the category feature. The target category can be one of the first category or the second category. The first category can be used to indicate that the content features between the two images are the same. The second category can be used to indicate that the content features of the two images are different.

The second result determination unit can be configured to, when the image feature correlation is determined to indicate that the image features of the first screen image and the second screen image are similar, determine that the image features of the first screen image and the second screen image are similar if the target category is the first category.

In some other embodiments, the category feature determination unit can include a category feature determination sub-unit.

The category feature determination sub-unit can be configured to input the first defect image area and the second defect image area as a set of images into the category comparison model to obtain the category feature output by the category comparison model.

The category determination unit can include a category determination sub-unit.

The category determination sub-unit can be configured to input the category feature into the classification model to obtain the target category output by the classification model. The category comparison model and the classification model can be trained based on the plurality of pairs of image samples marked with the belonging categories.

In some embodiments, the display screen being in the first test state can include the display state when the display screen is in the mode of displaying the determined color.

The display screen being in the second test state can include the display screen being in the black screen state.

In some other embodiments, the device can further include a defect pre-detection unit.

The defect pre-detection unit can be configured to input the first screen image into the defect detection model before the correlation determination unit determines the image features to obtain the image detection result output by the defect detection model.

When the correlation determination unit determines that the first screen image has the defect area, the image detection result output by the defect pre-detection unit can indicate that the first screen image has the defect area.

Figure 9:
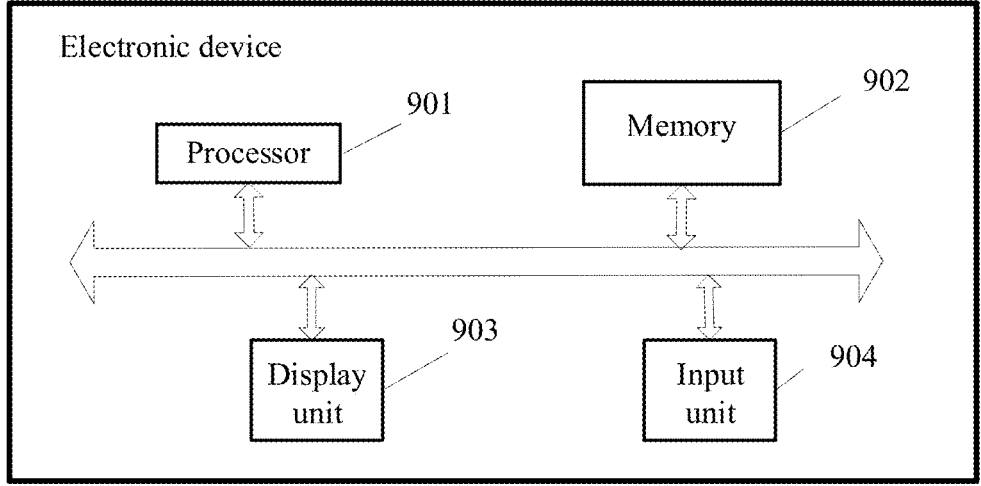
FIG. 9 illustrates a schematic structural diagram of an electronic device according to some embodiments of the present disclosure.

On another aspect, the present disclosure also provides an electronic device. FIG. 9 illustrates a schematic structural diagram of the electronic device according to some embodiments of the present disclosure. The electronic device can be any type of electronic device and at least includes a processor 901 and a memory 902.

The processor 901 can be configured to execute any defect detection method above.

The memory 902 can be used to store a program required for the processor to perform the operations.

In some embodiments, the electronic device can also include a display unit 903 and an input unit 904.

However, the electronic device can also include more or fewer members than the electronic device shown in FIG. 9, which is not limited.

On another aspect, the present disclosure also provides a computer-readable storage medium. The computer-readable storage medium can store at least one instruction, at least one segment of program, a code set, or an instruction set. The at least one instruction, the at least one segment of program, the code set, or the instruction set can be loaded and executed by a processor to implement any defect detection method above.

On another aspect, the present disclosure further provides a computer program. The computer program can include a computer instruction. The computer instruction can be stored in the computer-readable storage medium. When the computer program is running on the electronic device, any defect detection method above can be performed.

Embodiments of the present disclosure are described in a progressive manner. Each embodiment focuses on the differences from other embodiments. Similar parts among the embodiments can be referred to each other. Features described in various embodiments can be interchanged or combined to allow those skilled in the art to implement or use the present disclosure. Since device embodiments are similar to method embodiments, the description of the device embodiments is relatively simple, and relevant details can be referred to in the description of the method embodiments.

In the present disclosure, terms such as "first" and "second" are used to distinguish one entity or operation from another, without necessarily implying any actual relationship or order between these entities or operations. Additionally, terms such as "comprising," "including," or any variations thereof are intended to encompass non-exclusive inclusions. Thus, processes, methods, items, or devices including a series of elements also include other elements not explicitly listed, or elements inherent to such processes, methods, items, or devices. Without further limitation, when the element is limited by the term "including a . . . ," the processes, methods, items, or devices including the element can also include another same element.

The above description of embodiments of the present disclosure can allow those skilled in the art to implement or use the present disclosure. Modifications to these embodiments are obvious for those skilled in the art. The general principle defined in the present disclosure can be implemented in other embodiments without departing from the spirit or scope of the present disclosure. Thus, the present disclosure is not limited to embodiments of the present disclosure but conforms to the widest scope consistent with the principle and novel features of the present disclosure.

The above are some embodiments of the present disclosure. For those of ordinary skill in the art, modifications and decorations can be made to the present disclosure without departing from the principle of the present disclosure. The modifications and decorations are also within the scope of the present disclosure.

What is claimed is:

1. A defect detection method, comprising:
obtaining a first screen image and a second screen image of a screen module, wherein the first screen image is an image displayed by a display screen collected when the display screen of the screen module is in a first test state, and the second screen image is an image displayed by the display screen collected when the display screen is in a second test state;
in response to determining a defect area in the first screen image, determining an image feature correlation between the first screen image and the second screen image, including:
determining an image feature similarity between a first defect image area from the first screen image and a second defect image area from the second screen image, including:
inputting the first defect image area and the second defect image area into a similarity matching model to obtain the image feature similarity between the first defect image area and the second defect image area, the similarity matching model being trained based on a plurality of pairs of image samples marked with similarity matching results, and the first defect image area including the defect area, wherein:
the defect area indicates that the screen module has a display defect, and
the image feature correlation indicating that the image features between the first screen image and the second screen image are similar includes the image feature similarity exceeding a predetermined threshold; and
determining a defect detection result of the screen module based on the image feature correlation.

2. The method according to claim 1, wherein determining the defect detection result of the screen module based on the image feature correlation includes:
in response to the image feature correlation indicating that image features of the first screen image and the second screen image are not similar, determining that the screen module has the display defect; and
in response to the image feature correlation indicating that image features of the first screen image and the second screen image are similar, determining that the screen module does not have the display defect.

3. The method according to claim 1, wherein determining the image feature correlation between the first screen image and the second screen image further includes:
determining position information of the defect area in the first screen image; and
based on the position information, determining the first defect image area from the first screen image and the second defect image area from the second screen image, the second defect image area including an image area of the second screen image matching the position information.

4. The method according to claim 1, wherein determining the image feature correlation between the first screen image and the second screen image further includes:
determining a category feature between the first defect image area and the second defect image area, the category feature being used to indicate whether a content of the first defect image area has a same feature with a content of the second defect image area; and
based on the category feature, determining a target category to which the first defect image area and the second defect image area belong, the target category being one of a first category and a second category, the first category indicating that content features of the first defect image area and the second defect image area are same, and the second category indicating that the content features of the first defect image area and the second defect image area are different;
wherein the image feature correlation indicating that the image features of the first screen image and the second screen image are similar further includes that the target category is the first category.

5. The method according to claim 4, wherein:
determining the category feature between the first defect image area and the second defect image area includes inputting the first defect image area and the second defect image area into a category comparison model to obtain the category feature output by the category comparison model; and
determining the target category to which the first defect image area and the second defect image area belong based on the category feature includes inputting the category feature into a classification mode to obtain the target category output by the classification model, the category comparison model and the classification mode being trained based on a plurality of pairs of image samples marked with belonging categories.

6. The method according to claim 1, wherein:

the first test state of the display screen is a display state when the display screen is in a mode of displaying a determined color; and the second test state of the display screen is that the display screen is in a black screen state.

7. The method according to claim 1, further comprising:

inputting the first screen image into a defect detection model to obtain an image detection result output by the defect detection model;

wherein determining the defect area in the first screen image includes:

the image detection result indicating the defect area in the first screen image.

8. An electronic device, comprising:

a processor; and a memory storing a computer program that, when executed by the processor, causes the processor to:

obtain a first screen image and a second screen image of a screen module, wherein the first screen image is an image displayed by a display screen collected when the display screen of the screen module is in a first test state, and the second screen image is an image displayed by the display screen collected when the display screen is in a second test state;

in response to determining a defect area in the first screen image, determine an image feature correlation between the first screen image and the second screen image, including:

determining an image feature similarity between a first defect image area from the first screen image and a second defect image area from the second screen image, including:

inputting the first defect image area and the second defect image area into a similarity matching model to obtain the image feature similarity between the first defect image area and the second defect image area, the similarity matching model being trained based on a plurality of pairs of image samples marked with similarity matching results, and the first defect image area including the defect area, wherein:

the defect area indicates that the screen module has a display defect, and the image feature correlation indicating that the image features between the first screen image and the second screen image are similar includes the image feature similarity exceeding a predetermined threshold; and determine a defect detection result of the screen module based on the image feature correlation.

9. The device according to claim 8, wherein the processor is further configured to:

in response to the image feature correlation indicating that image features of the first screen image and the second screen image are not similar, determine that the screen module has the display defect; and in response to the image feature correlation indicating that image features of the first screen image and the second screen image are similar, determine that the screen module does not have the display defect.

10. The device according to claim 8, wherein the processor is further configured to:

determine position information of the defect area in the first screen image; and based on the position information, determine the first defect image area from the first screen image and the second defect image area from the second screen image, the second defect image area including an image area of the second screen image matching the position information.

11. The device according to claim 8, wherein the processor is further configured to:

determine a category feature between the first defect image area and the second defect image area, the category feature being used to indicate whether a content of the first defect image area has a same feature with a content of the second defect image area; and based on the category feature, determine a target category to which the first defect image area and the second defect image area belong, the target category being one of a first category and a second category, the first category indicating that content features of the first defect image area and the second defect image area are same, and the second category indicating that the content features of the first defect image area and the second defect image area are different;

wherein the image feature correlation indicating that the image features of the first screen image and the second screen image are similar further includes that the target category is the first category.

12. The device according to claim 11, wherein the processor is further configured to:

input the first defect image area and the second defect image area into a category comparison model to obtain the category feature output by the category comparison model; and input the category feature into a classification mode to obtain the target category output by the classification model, the category comparison model and the classification mode being trained based on a plurality of pairs of image samples marked with belonging categories.

13. The device according to claim 8, wherein:

the first test state of the display screen is a display state when the display screen is in a mode of displaying a determined color; and the second test state of the display screen is that the display screen is in a black screen state.

14. The device according to claim 8, wherein the processor is further configured to:

input the first screen image into a defect detection model to obtain an image detection result output by the defect detection model;

wherein determining the defect area in the first screen image refers to the image detection result indicating the defect area in the first screen image.

15. A non-transitory computer-readable storage medium storing a computer instruction that, when executed by a processor, causes the processor to perform the method according to claim 1.

16. The storage medium according to claim 15, wherein the processor is further configured to:

in response to the image feature correlation indicating that image features of the first screen image and the second screen image are not similar, determine that the screen module has the display defect; and in response to the image feature correlation indicating that image features of the first screen image and the second screen image are similar, determine that the screen module does not have the display defect.

17. A defect detection method, comprising:

obtaining a first screen image and a second screen image of a screen module, wherein the first screen image is an image displayed by a display screen collected when the display screen of the screen module is in a first test state, and the second screen image is an image displayed by the display screen collected when the display screen is in a second test state;

in response to determining a defect area in the first screen image, determining an image feature correlation between the first screen image and the second screen image, including:

determining a category feature between a first defect image area from the first screen image and a second defect image area from the second screen image, including:

inputting the first defect image area and the second defect image area into a category comparison model to obtain the category feature output by the category comparison model, the category feature being used to indicate whether a content of the first defect image area has a same feature with a content of the second defect image area, and the first defect image area including the defect area, wherein the defect area indicates that the screen module has a display defect; and based on the category feature, determining a target category to which the first defect image area and the second defect image area belong, including:

inputting the category feature into a classification mode to obtain the target category output by the classification model, the category comparison model and the classification mode being trained based on a plurality of pairs of image samples marked with belonging categories, the target category being one of a first category and a second category, the first category indicating that content features of the first defect image area and the second defect image area are same, and the second category indicating that the content features of the first defect image area and the second defect image area are different, wherein the image feature correlation indicating that the image features of the first screen image and the second screen image are similar includes that the target category is the first category; and determining a defect detection result of the screen module based on the image feature correlation.

\* \* \* \* \*